US011627306B2

(12) United States Patent
Goergen et al.

(10) Patent No.: US 11,627,306 B2
(45) Date of Patent: Apr. 11, 2023

(54) SYSTEM AND METHOD FOR IDENTIFYING B-ROLL CONDITIONS IN LIVE STREAMS OR LIVE RENDERED CONTENT

(71) Applicant: Universal City Studios LLC, Universal City, CA (US)

(72) Inventors: Patrick J. Goergen, Orlando, FL (US); Danielle Marie Holstine, Orlando, FL (US); Christopher Herbert, Orlando, FL (US); Wei Cheng Yeh, Orlando, FL (US); Travis Jon Cossairt, Orlando, FL (US)

(73) Assignee: Univeral City Studios LLC, Universal City, CA (US)

( * ) Notice: Subject to any disclaimer, the term of this patent is extended or adjusted under 35 U.S.C. 154(b) by 0 days.

(21) Appl. No.: 17/319,893

(22) Filed: May 13, 2021

(65) Prior Publication Data
US 2021/0266523 A1 Aug. 26, 2021

Related U.S. Application Data

(62) Division of application No. 16/513,428, filed on Jul. 16, 2019, now Pat. No. 11,025,900.

(60) Provisional application No. 62/699,739, filed on Jul. 18, 2018.

(51) Int. Cl.
H04N 17/04 (2006.01)
H04N 5/268 (2006.01)
G06T 7/00 (2017.01)

(52) U.S. Cl.
CPC .......... H04N 17/04 (2013.01); G06T 7/0002 (2013.01); H04N 5/268 (2013.01); G06T 2207/10016 (2013.01); G06T 2207/10024 (2013.01); G06T 2207/30168 (2013.01)

(58) Field of Classification Search
CPC ........ H04N 17/04; H04N 5/268; H04N 17/00; H04N 17/02; G06T 7/0002; G06T 2207/10016; G06T 2207/30168; G06T 2207/10024
USPC .................. 382/100, 309; 348/180, 192–193
See application file for complete search history.

(56) References Cited

U.S. PATENT DOCUMENTS

| 5,621,467 A | 4/1997 | Chien et al. |
| 6,774,885 B1 | 8/2004 | Even-Zohar |
| 7,955,168 B2 | 6/2011 | Medelsohn et al. |
| 8,184,164 B2 | 5/2012 | Yang et al. |

(Continued)

OTHER PUBLICATIONS

Sarreshtedari, Saeed et al., "A Source-Channel Coding Approach to Digital Image Protection and Self-Recovery",IEEE Transactions on Image Processing, vol. 24, No. 7, Jul. 1, 2015, pp. 2266-2276.

(Continued)

Primary Examiner — Trang U Tran
(74) Attorney, Agent, or Firm — Fletcher Yoder P.C.

(57) ABSTRACT

A video stream management system includes a video controller that live renders video. Moreover, the video stream management system also includes a display that is communicatively coupled to the video controller and displays a primary video feed that includes the live rendered video. The video controller, the display, or a combination thereof, embeds a pixel pattern in the primary video feed. Additionally, the video feed management system monitors one or more displayed images on the display to identify an error in the primary video feed.

18 Claims, 4 Drawing Sheets

(56) References Cited

U.S. PATENT DOCUMENTS

| | | | |
|---|---|---|---|
| 8,565,473 B2 * | 10/2013 | Rodriguez | G06T 1/0021 |
| | | | 382/100 |
| 8,839,286 B2 * | 9/2014 | Auwens | H04N 21/44209 |
| | | | 725/32 |
| 9,467,688 B2 * | 10/2016 | Karimi-Cherkandi | |
| | | | H04N 7/147 |
| 10,238,979 B2 | 3/2019 | Boyle et al. | |
| 2003/0112996 A1 | 6/2003 | Holliman et al. | |
| 2006/0092269 A1 | 5/2006 | Baird et al. | |
| 2007/0223778 A1 | 9/2007 | Hobson et al. | |
| 2007/0256105 A1 | 11/2007 | Tabe | |
| 2014/0240516 A1 * | 8/2014 | Kolarov | G09G 5/14 |
| | | | 348/180 |

OTHER PUBLICATIONS

PCT/US2019/042283 Invitation to Pay Additional Fees dated Sep. 18, 2019.

* cited by examiner

SYSTEM AND METHOD FOR IDENTIFYING B-ROLL CONDITIONS IN LIVE STREAMS OR LIVE RENDERED CONTENT

CROSS-REFERENCE TO RELATED APPLICATIONS

This application is a divisional of U.S. Non-Provisional application Ser. No. 16/513,428, entitled "SYSTEM AND METHOD FOR IDENTIFYING B-ROLL CONDITIONS IN LIVE STREAMS OR LIVE RENDERED CONTENT," filed Jul. 16, 2019, which claims priority from and the benefit of U.S. Provisional Application No. 62/699,739, entitled "SYSTEM AND METHOD FOR IDENTIFYING B-ROLL CONDITIONS IN LIVE STREAMS OR LIVE RENDERED CONTENT," filed Jul. 18, 2018, each of which is hereby incorporated by reference in its entirety for all purposes.

BACKGROUND

The present disclosure relates generally to the field of amusement parks. Specifically, embodiments of the present disclosure relate to techniques to manage amusement park operations, including managing video streams for rides or attractions.

In certain settings, such as amusement park settings, certain rides and other equipment have become increasingly interactive. Among other things, this means that certain aspects of rides and equipment may not necessarily be scripted. Indeed, as such rides and guest activated equipment become more dynamic, such as live rendered or game-centric, it becomes increasingly difficult to identify when components of the attractions, such as displayed visuals on the attractions, are not displaying as intended. Assigning operators to monitor and/or resolve unexpected display issues may result in inaccurate and inefficient park operations. Additionally, this reliance may lead to situations where a guest experience is affected due to equipment malfunctions or failure. Accordingly, a need exists for techniques and systems that are able to identify issues with displayed media, and take corrective action to address such issues.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a video stream management system includes a video controller that live renders video. The video stream management system also includes a display that is communicatively coupled to the video controller and displays a primary video feed that includes the live rendered video. The video controller, the display, or a combination thereof, embeds a pixel pattern in the primary video feed. The video feed management system monitors one or more displayed images on the display to identify an error in the primary video feed.

In one embodiment, a method for managing a video feed includes embedding a dynamic pixel pattern into frames of a live video feed. The dynamic pixel pattern includes a first pixel pattern associated with a first frame and a second pixel pattern associated with a second frame, in which the first pixel pattern is different than the second pixel pattern. The method also includes displaying the live video feed having the dynamic pixel pattern using a display. Additionally, the method includes monitoring displayed images on the display. Moreover, the method includes identifying an error in the live video feed in response to determining that the monitored displayed images include displayed pixel patterns that do not match the embedded dynamic pixel pattern. Furthermore, the method includes switching from displaying the live video feed to displaying an alternative video feed in response to identifying the presence of the error in the live video feed.

In one embodiment, video stream management system includes one or more sensors that detect a guest presence, a video stream controller, and a display communicatively coupled to the video stream controller. The video stream controller live renders video based on the detected guest presence to generate a primary video stream, and embeds a pixel pattern in the primary video stream to generate a video stream. The display receives the video stream, displays the video stream to generate displayed images, monitors the displayed images on the display to identify an error based on a comparison of the displayed images and the pixel pattern, and generates an error signal based on identifying the error.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
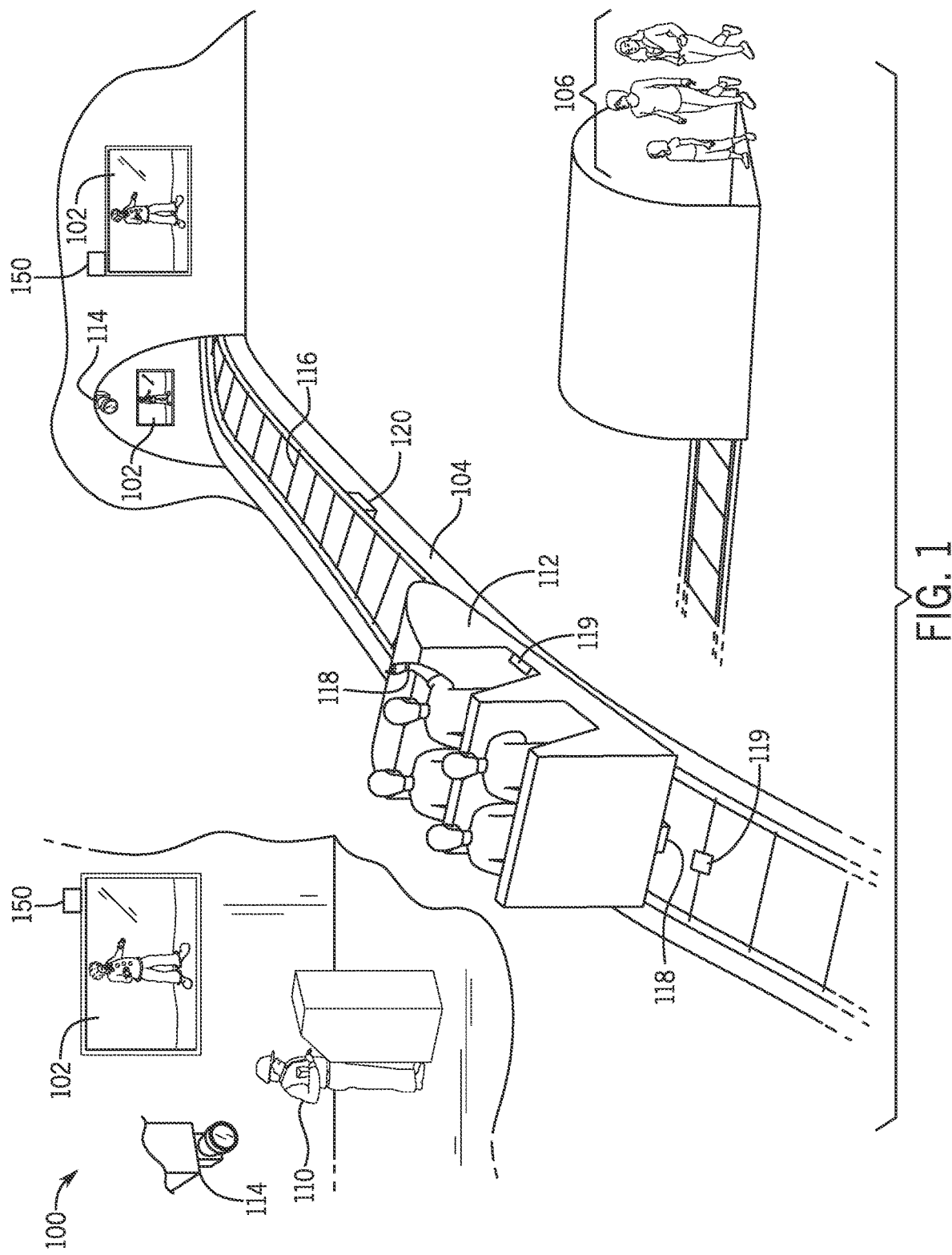
FIG. 1 is a schematic diagram of an amusement park ride including an attraction utilizing a video stream monitoring system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Amusement parks feature a wide variety of entertainment, such as amusement park rides, performance shows, and games. The different types of entertainment may include interactive or live rendered features that enhance a guest's experience at the amusement park. The interactive feature may include rides or equipment that are activated based on the presence of a guest. For example, a display used as part of an attraction environment may be interactive, such that elements or objects displayed may become activated or triggered to change based on the detected presence of the guest rather than operating on a timer and/or as a prerecorded playback. The changes may include variations in the displayed video environment, including lighting, textures, animation, etc. However, the changes in the display may nonetheless retain some objects or features that may be perceived as unchanged. Thus, it may be difficult to observe when the interactive aspect of the video stream is no longer interactive since some features (e.g., background) may remain unchanged. Additionally or alternatively, the video stream display may be live rendered, such that the video display changes are in "real time." The play back may be fast and perceived to be in real time. It may also be difficult to observe when the live rendered playback is no longer live rendered (e.g., in the case of a frozen display).

External factors may cause the interactive and/or live rendered video stream to act in an unexpected manner, such that the interactive features on the display are no longer interacting with the guest or live rendered images are no longer changing in real time. Thus, the video stream displayed may no longer provide seamless viewing for the guests on the ride. Ordinarily, operators may be tasked to monitor and resolve the unexpected display behavior. However, relying on one attraction operator to resolve the behavior may distract the operator from other important tasks, such as managing guest throughput and ride dispatch. Further, monitoring in this manner may require multiple operators when multiple displays are present. Tasks such as resolving issues, providing resolution data, and reviewing of the video stream data by monitoring personnel, may result in unreasonable delay in ride dispatches and possible ride downtime. Additionally, there may be inconsistent and inaccurate monitoring of the video stream by the various operators since identifying the unexpected behavior may be difficult to determine in the interactive or live video stream. Thus, manual video display monitoring may be difficult and inefficient, resulting in poor guest viewing and interactions, unnecessary wait time between ride dispatches, which may further result in longer queues and decreased guest enjoyment of the amusement park.

It should be noted that although examples provided herein may be presented generally in an amusement park and ride attraction context, such as using the present techniques to facilitate monitoring displays provided on rides or as part of attraction environments, the techniques in this disclosure may be applied to other non-amusement park related conditions and/or contexts. Thus, the present examples should be understood to merely reflect a real-world example of a display monitoring system on rides to provide useful context for the discussion, and should not be viewed as limiting the applicability of the present approach. Instead, the present approach should be understood as being applicable to other situations in which videos are displayed.

With the present in mind, FIG. 1 is a schematic representation of an amusement park ride 100 that may include a video stream on a display 102. For example, in the depicted embodiment, the amusement park ride 100 may include one or more displays 102 along a ride path 104. The ride 100 may be accessed via a guest queue 106, and the ride may be considered ready when a variety of conditions, including display conditions, are met. The display conditions may be conditions that allow a seamless viewing experience on the one or more displays 102. As shown, a ride operator 110 may operate the ride, such that guests are signaled to enter a ride cart 112 (e.g., ride vehicle) when the operator determines that display conditions are met.

Display conditions may be satisfied when the interactive and/or live rendering features of a video stream are properly functioning, such that features of the video stream including environments, elements, or animations are perceived in real time and/or triggered to respond to a detected guest presence or gestures. The detection of the guest presence may include a variety of sensing mechanisms.

In one embodiment, and as depicted, a camera 114 or a series of cameras 114 that may be installed along the ride 100, including along the ride path 104, may detect guest presence and/or gestures. Additionally or alternatively, the cameras 114 may be integrated into the display 102. The cameras 114 may use a variety of detection mechanisms, including but not limited to, facial recognition, skeletal tracking, body-heat recognition, and so forth. The cameras 114 may also capture movements (e.g., gestures) of the guest and use those captured movements to simulate live rendering or interaction with elements or animations shown on the display 102. The video stream shown on the display 102 may also be a live feed of the guest (captured by the camera 114), or a live rendered video that includes a representation of the guest.

In another embodiment, guest presence detection may be performed by one or more sensors, such as radio frequency identification (RFID) tags 118 incorporated into a ride cart 112 or a guest wearable device, or weight sensors 120 disposed along ride tracks 116. These sensors may be placed or positioned in areas based on where guest presence is expected (e.g., on a seat in the ride cart 112). The RFID tags 118 may communicate with an electronic reader 119 incorporated on the ride 100, such as on the ride tracks 116 or the ride cart 112 (e.g., inside, on the side, or on the entryway of the ride cart 112), to indicate presence of the RFID tags 118. Thus, an electronic reader 119 placed on the ride path 104 (e.g., ride tracks 116 or the ride cart 112) may scan an RFID tag 118 on a ride cart 112 as the ride cart 112 passes over the electronic reader 119. Additionally or alternatively, weight sensors 120 may be mounted on the ride tracks 116 and may be used to indicate the presence of the ride cart 112 on the ride tracks 116 based on a predetermined weight. The RFID tags 118 and/or weight sensors 120 detecting guest presence may trigger a live rendering or interactive video on the display 102. Additionally, the sensors may trigger a guest presence indication to the cameras 114 to turn on the cameras or narrow the ride area scope of where guests may be detected. Thus, the cameras 114 may be used alone or in conjunction with other detection mechanisms (e.g., RFID tags 118 or weight sensors 120) to detect track a guest.

Once a guest presence is identified and tracked, the display 102 may change, such that objects on the display 102 may seemingly interact or react to the guests. The animation or live stream rendering may react according to the movement of the guest and position of the guest relative to the display 102. In the illustrated embodiment, a clown is depicted on the display 102. The depicted clown may react (e.g., juggle) in response to detecting the guest and/or their tracked movements. Thus, the clown video display may be a live stream video and/or interactive based on guest movement. As previously mentioned, an interactive and/or live stream video (e.g., the clown video) may stop interacting or displaying in real-time, and may rely on either a guest or an operator 110 to detect the unexpected change in display. A video stream management system 150, in accordance with an embodiment of the present disclosure, may be used to automatically detect an unexpected display and switch to an alternative video source to allow for a seamless viewing experience.

With the foregoing in mind, the presently disclosed embodiments may determine when a video stream sent to a display 102 and/or the display 102 itself is no longer displaying the expected image. That is, in some embodiments, the video stream management system 150 may use a video stream with an embedded pixel pattern to detect an unexpected display and then switch to an alternative video stream to provide seamless viewing for an optimal guest experience.

Figure 2:
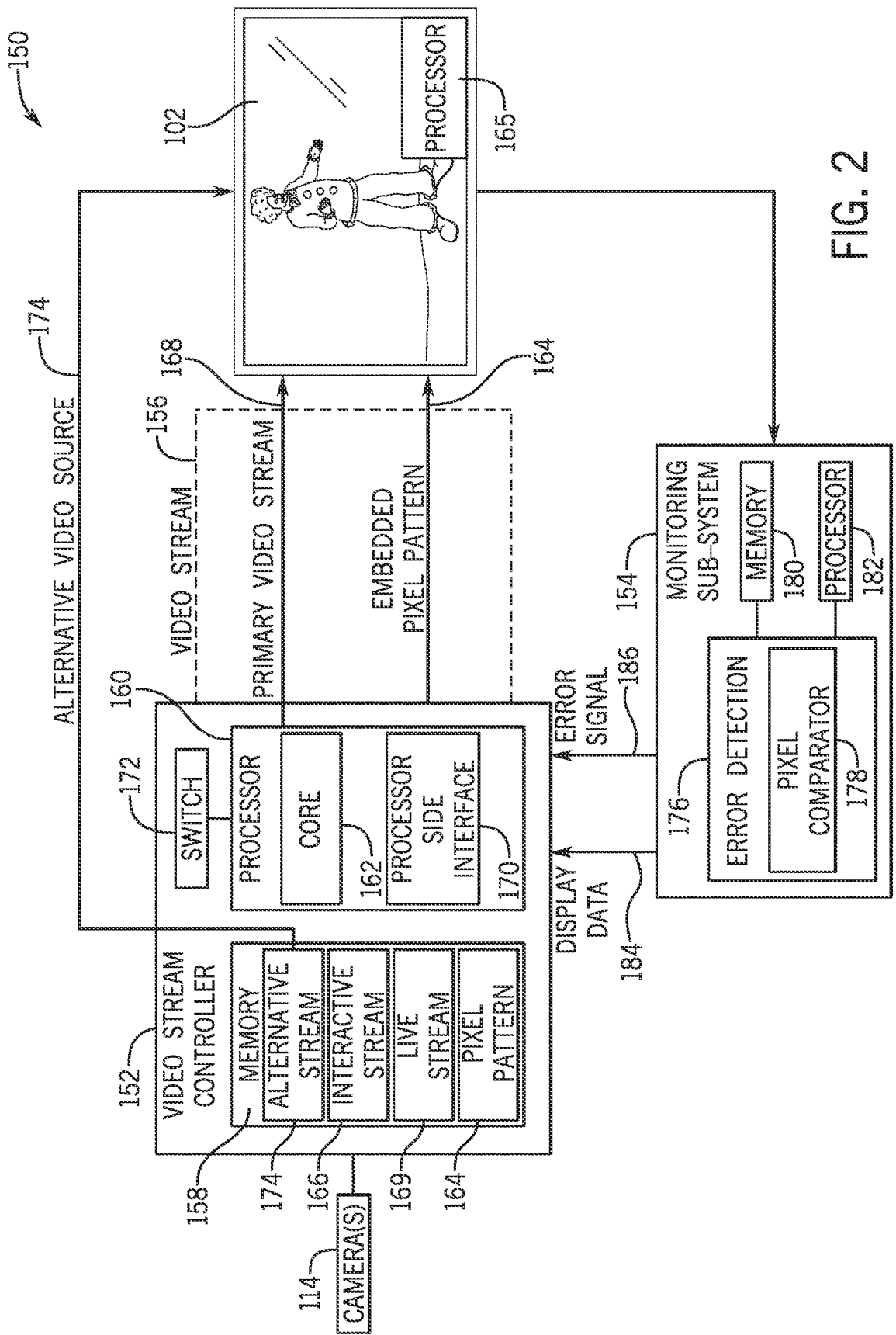
FIG. 2 is a block diagram of the video stream monitoring system used in the attraction of FIG. 1, in accordance with an embodiment of the present disclosure.

The configuration and function of the video stream management system 150 may be better understood with reference to FIG. 2, which illustrates a block diagram of a video stream management system 150 for monitoring and switching video streams using techniques provided herein. The video stream management system 150 includes at least one camera 114, a video stream controller 152, a monitoring sub-system 154, and the display 102, which may represent one or multiple displays 102. Although some of the following descriptions describe the camera 114, video stream controller 152, monitoring sub-system 154, and display 102 as separate components of the video stream management system 150 indirectly coupled or directly coupled via wires/cables, which represents a particular embodiment, it should be noted that the methods and systems may be performed and implemented using any suitable arrangement of components, such as all the components integrated in one display 102. For example, the monitoring sub-system 154 may also be included in the video stream controller 152, and the video stream controller 152 may be integrated in the display 102. Further, the display 102 may include the camera 114. Thus, in one embodiment, all the functions (e.g., detecting, monitoring, switching, etc.) may be provided by the single integrated display 102. The display 102 may include a plurality of pixels.

As illustrated, one or more cameras 114 may be coupled to the video stream controller 152. The cameras 114 may be used to track guests (e.g., detect guest presence and/or capture guest movement), such that guest movement may be used for an interactive or live rendering video stream. Once guest presence or movement is detected and/or tracked, the cameras 114 may send the detection and/or tracking signals to the video stream controller 152. The video stream controller 152 may use the camera signals to enable a video stream 156 to be sent to the display 102. The video stream controller 152 may include a memory 158 for storing instructions executable by a processor 160.

The processor 160 may include one or more processing devices, and the memory 158 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor 160 or by other processor-based devices. The processor 160 may include a processing core 162 to execute machine-executable instruction algorithms stored in the memory 158.

The stored algorithms may include algorithms to send video data streams to the display 102, including an embedded pixel pattern 164, an interactive video stream 166, a live rendered video stream 169, and/or an alternative video source 174, such as a pre-recorded video stream. The processor 160 may also include processor-side interfaces 170 for software applications running on the processing core 162 to interact with hardware components on the ride 100, such as the display 102 and cameras 114, associated with the processor 160.

The embedding of the pixel pattern 164 may include modification of the data associated with a primary video stream 168 to generate the video stream 156 that is provided to the display 102. The primary video stream 168, as provided herein, may refer to the video stream associated with an interactive video, such as the live rendered video stream 169 or the interactive video stream 166. The primary video stream 168 is embedded with the embedded pixel pattern 164 by modifying image data of one or more images (e.g., individual frames of the primary video stream) such that the modified one or more images, when displayed, display the embedded pixel pattern 164. In one embodiment, the image data of the one or more images include information encoding the color for each pixel associated with the embedded pixel pattern 164. Accordingly, when modified with the embedded pixel pattern 164, the one or more images of the video stream 156 display different colors for one or more pixels relative to the primary video stream 168. It should be understood that the images in the primary video stream may include certain pixels that are already encoded to display the color associated with the embedded pixel pattern 164. That is, the source image(s) may already be black at a certain pixel location that corresponds with a black pixel of the embedded pixel pattern 164. However, the embedded pixel pattern 164 may be sufficiently complex and varied such that a source image is statistically unlikely to exhibit the complete embedded pixel pattern 164 without modification. Further, the embedded pixel pattern 164 may be dynamic and change from frame-to-frame, which further reduces alignment of the original source image with the embedded pixel pattern 164. The dynamic features of the embedded pixel pattern 164 may include translation of the embedded pixel pattern 164 to different pixel locations across successive frames, a change of color of all pixels associated with an embedded pixel pattern 164 in a subsequent frame, and/or different arrangements of pixels in the embedded pixel pattern 164.

The video stream controller 152 may also include a switch 172 or series of switches coupled to the processor 160. Based on instructions executed from the processor 160, the switch 172 may be used to implement switching data streams sent to the display 102. As depicted, and in some embodiments, the processor 160 may transmit a primary video stream 168, such as the live rendered video stream 169 or the interactive video stream 166, along with the embedded pixel pattern 164, as the video stream 156 over a cable (e.g., High-Definition Multimedia Interface (HDMI) cable) to the display 102. The embedded pixel pattern 164 may be embedded in the primary video stream 168 and may be used to detect unexpected display behavior.

In addition to providing the video stream 156 for the display 102, the video stream management system 150 may also operate to automatically resolve unexpected display behavior by switching video streams. For example, the video stream management system 150 may switch the displayed video stream 156 to the alternative video source 174, which may be streamed to the display 102 concurrently. The switch 172 of the video stream controller 152 and/or a display processor 165 of the display 102 may control which stream is displayed on the display 102 for the ride 100. In the depicted embodiment, the display 102 configuration may default to the video stream 156 and may switch to the alternative video source 174 based on additional instructions sent by the video stream controller 152 and processed by the display processor 165. The additional instructions may be sent and executed based on a display error detection by the monitoring sub-system 154 when an unexpected display behavior is detected.

In particular, the monitoring sub-system 154 may include error detection logic 176, a monitoring sub-system memory 180, and a monitoring sub-system processor 182. Algorithms may be used to identify errors on the display 102, for example using error thresholds and pattern identification. The algorithms may be stored in the monitoring sub-system memory 180 and executed by the monitoring sub-system processor 182.

A pixel comparator 178 of the error detection logic 176 may determine an unexpected display, as will be discussed in detail below. The pixel comparator 178 may be used to compare the image pixels of the displayed video stream 156 as displayed on the display 102 to one or more pixel patterns stored in the monitoring sub-system memory 180 and/or a pixel pattern sent via the embedded pixel pattern 164. The monitoring sub-system 154 may relay received display data 184 regarding pixel or pixel patterns to the video stream controller 152. The error detection logic 176 may generate an error signal 186 upon identification of an error. The monitoring sub-system 154 may also send the error signal 186 to the video stream controller 152 when the error detection logic 176 detects unexpected display behavior. The unexpected display behavior may be determined based on an expected pixel pattern stored in the monitoring sub-system memory 180 versus the pixel pattern displayed on the display 102. In some embodiments, information about the embedded pixel pattern 164 may only be accessible by authorized users. In such embodiments, the embedded pixel pattern 164 may be encrypted or may be accessible only with a key. A key stored in the sub-system memory 180 for an authorized user may be used to decrypt or verify the embedded pixel pattern 164 also stored in the monitoring sub-system memory 180 to plaintext, which may be used subsequently to identify errors (e.g., unexpected display behavior). The key may be generated based on metadata, a network connection, and/or a memory location (e.g., sub-system memory 180). For example, if the video stream controller 152 is connected to a particular network, such as an unauthorized or unrecognized network, the video stream controller 152 may not access the embedded pixel pattern 164 without inputting or loading the paired key (e.g., unique private key per network connection). As such, the video stream controller 152 may not be able to identify or compare currently displayed pixels to the expected embedded pixel pattern 164 to identify unexpected display behavior without using the key. Examples of unexpected display behavior may include, but are not limited to, a dialog box blocking at least part of a video frame sent by the video stream 156, a frozen video frame, a failure to display the video stream 156 (e.g., black screen), and/or incorrect pixel illumination (e.g., pixel color or brightness) at a particular pixel positon on the display 102. Additionally or alternatively, an error detection algorithm on the video stream controller 152 may be used determine an error or unexpected display behavior based on the received display data 184.

In an embodiment the comparator 178 operates to count pixel mismatches per frame in the video stream 156 between the displayed image and the expected pixel pattern for that frame. The threshold may be set to a threshold number of pixel mismatches, whereby a determination of a lower number of mismatches than the threshold is indicative of a correct video stream 156 and a higher number of pixel mismatches than the threshold is indicative of an error. For example, there may be a certain allowed tolerance of 1-2 pixel mismatches to account for malfunctioning pixels. In an embodiment, the comparator 178 may be set to require pixel mismatches above the threshold to be present in at least a certain number of frames before triggering an indication of error and, therefore, a switch to the alternative video source 174. Each individual frame or only a subset of the frames of the video stream 156 may include an embedded pixel pattern 164 (e.g., an expected pixel pattern). The comparator may associate a displayed image with an expected embedded pixel pattern 164. That is, for dynamic embedded pixel patterns 164 in which the pixel pattern changes between frames of the video stream, the expected embedded pixel pattern 164 for a displayed image of the video stream may be associated with a particular frame identifier, which may be part of the metadata for the video stream 156. The display processor 165 may, during displaying, provide the metadata with the frame identifier to the error detection logic 176 so that the expected pixel pattern for that particular frame may be used by the comparator 178.

The detection of errors may occur at the device (e.g., the display 102) that receives the video stream 156. Any active rendering or interactive changes to the video stream 156 may occur at the video stream controller 152. However, in other embodiments, the video stream controller 152 and the display 102 are provided as a unitary device. In an embodiment, the video stream 156 is formed from a series of successive image frames, whereby each image frame is displayed using a plurality of pixels of the display 102. The pixel pattern (e.g., the embedded pixel pattern 164) may be formed from or incorporate only a subset of the total pixels used in displaying images with the display 102. For example, the pixel pattern for each frame or image may involve less than 10%, 5%, 2%, or 1% of the available pixels on the display 102. In this manner, the pixel comparator 178 of the error detection logic 176 at the receiving device may assess only a subset of the available pixels (e.g., only those pixels associated with the expected pixel pattern) of the display 102, thus avoiding complex full image/video comparison operations for faster and more efficient detection of errors within the video stream 156.

Figure 3:
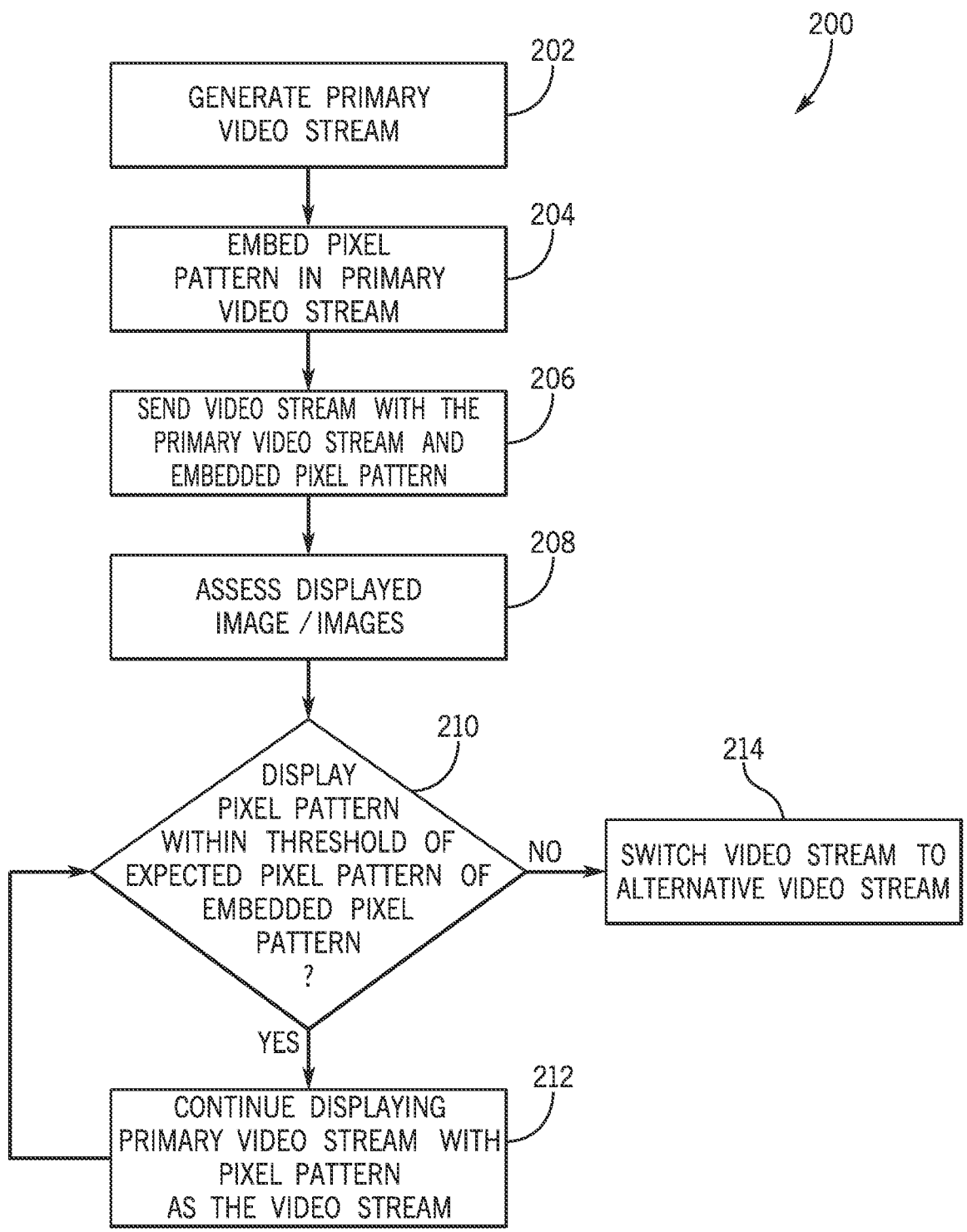
FIG. 3 is a process flow diagram of a method for monitoring and sending an alternative video stream to a display based on an unexpected display detected using the video stream monitoring system, in accordance with an embodiment of the present disclosure.

To illustrate examples of the error detection logic 176 of the monitoring sub-system 154 in detail, a process 200 for detecting an unexpected display and/or generating a response to the unexpected display is described in FIG. 3. Generally, the process 200 includes generating (process block 202) a primary video stream 168, embedding (process block 204) a pixel pattern 164 in the primary video stream 168, sending (process block 206) a video stream 156 that includes the primary video stream 168 with the embedded pixel pattern 164 to the display 102, and assessing (process block 208) the displayed image(s) on the display 102 to identify whether the expected pixel pattern is being displayed and evaluating whether (decision block 210) the displayed image includes the expected pixel pattern within a predetermined threshold. If the pixel pattern identified in the displayed image is within the threshold, the display 102 continues (process block 212) to display the primary video stream 168 with the embedded pixel pattern 164 as the video stream 156, and if the pixel pattern is not within the threshold, then the display 102 switches (process block 214) the video stream 156 to the alternative video source 174.

While the process 200 is described using acts in a specific sequence, it should be understood that the described acts may be performed in different sequences than the sequence illustrated, and certain described acts may be skipped or not performed altogether. In general, at least some of the steps of process 200 may be implemented at least in part by the video stream management system 150. Specifically, these steps may be implemented at least in part by the processor 160 of the video stream controller 152 or the monitoring sub-system processor 182 of the monitoring sub-system 154 that executes instructions stored in a tangible, non-transitory, computer-readable medium, such as the monitoring sub-system memory 180. In alternative or additional embodiments, at least some steps of the process 200 may be implemented by any other suitable components or control logic, and the like.

Thus, in some embodiments, the video stream controller 152 may generate (process block 202) a primary video stream 168. As previously discussed, the primary video stream 168 may include any video data stream, such as the interactive video stream 166, the live rendered video stream 169, and/or the alternative video source 174, such as a pre-recorded video bitstream. The primary video stream 168 may be predetermined by a user or an operator 110. The video stream type used may be based on the ride 100 and or targeted guests. For example, the ride type of the ride 100 of FIG. 1 may include a clown theme and may be targeted at younger guests, and thus, the primary video stream 168 may include the interactive video stream 166 to allow a clown to react to guest gestures.

In some embodiments, the video stream controller 152 may embed a pixel pattern as the embedded pixel pattern 164 along with the primary video stream 168 to create the video stream 156 (process block 204). The embedded pixel pattern 164 may be a data stream that may cause a pixel or an array of pixels of the display 102 to emit a particular color or absence of color. In some embodiments, the pixel pattern may be dynamic, such that the color at a particular pixel of the display 102 may change with each frame of image displayed. In other embodiments, the pixel pattern may be static and remain unchanged between the frames.

After the video stream controller 152 has embedded the primary video stream 168 with the embedded pixel pattern 164, it may send (process block 206) the data streams as one video stream 156 to the display 102. Since the pixel pattern is embedded within the video stream (e.g., within one or more individual frames of the primary video stream 168) 156, the pixel pattern may be designed such that it is not visible or detectable by a human eye. In this manner, the pixel pattern is only detectable by the video stream management system 150 and may allow a guest to continue enjoying a seamless viewing experience on the ride 100.

Figure 4:
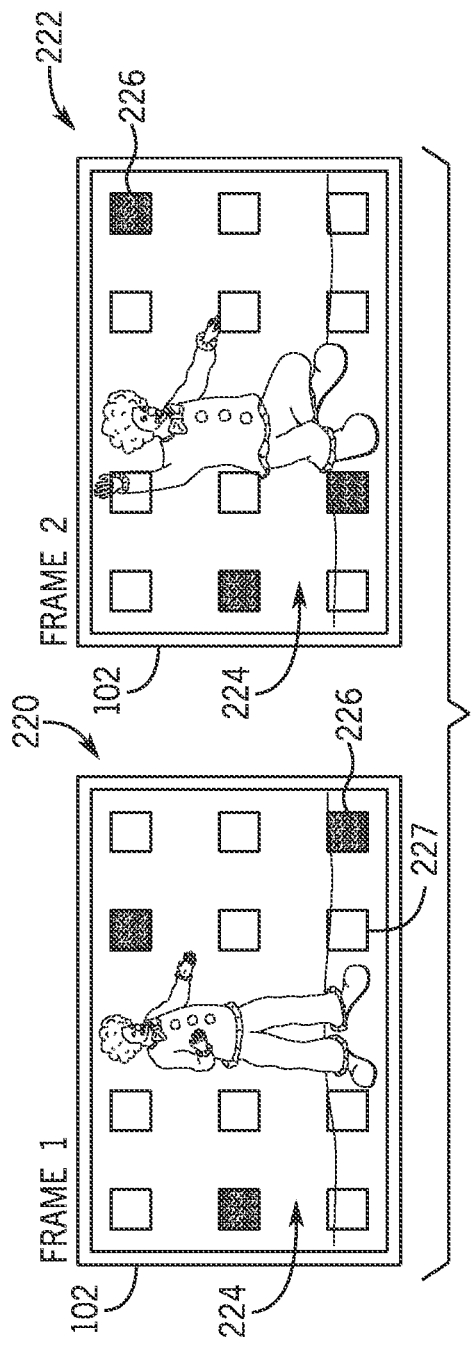
FIG. 4 is a schematic diagram of frames of image data provided by an interactive or live rendered video stream with an embedded dynamic pixel pattern, in accordance with an embodiment of the present disclosure.
Figure 6:
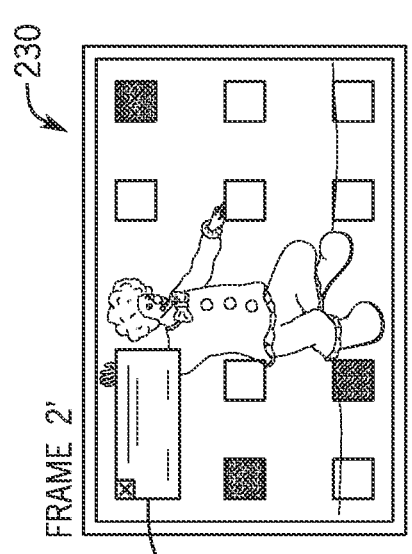
FIG. 6 is a schematic diagram of another example of an unexpected display on the frames of FIG. 4, in accordance with an embodiment of the present disclosure.
Figure 5:
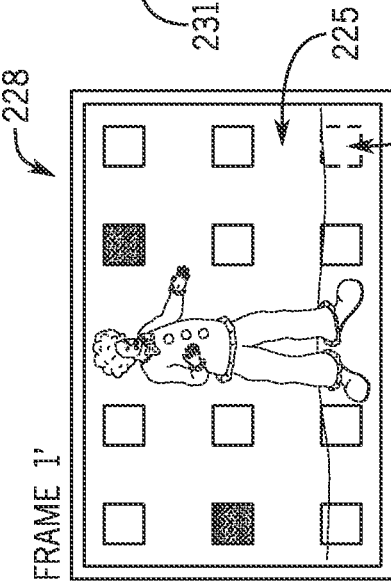
FIG. 5 is a schematic diagram of an example of an unexpected display on the frames of FIG. 4, in accordance with an embodiment of the present disclosure.

Once the primary video stream 168 with the embedded pixel pattern 164 is sent to the display 102, the monitoring sub-system 154 may determine (process block 208) the pixel pattern being displayed on the display 102. To illustrate the determination of expected pixel pattern and displayed image for error detection, FIGS. 4-6 show frames of image data displayed 102 with the embedded pixel pattern 164. Moreover, although some of the following descriptions describe a pixel pattern shown with the displayed image data, which may be described to facilitate an explanation of error detection using pixels, it should be noted that the methods and systems performed and implemented may utilize a hidden pixel pattern that is not detectable by the human eye. That is, the embedded pixel pattern 164 is designed to allow detection by the video stream management system 150 and its components but not by guests.

As illustrated, FIG. 4 depicts a first frame 220 (Frame 1) and a second frame 222 (Frame 2) of image data displaying interactive and/or live rendered image data with a dynamic embedded pixel pattern 224 (e.g., pixel pattern 164) on the display 102. The pixel pattern 224 may include at least one pixel displayed along with each of the frames 220 and 222 of image data on the display 102. The first frame 220 and the second frame 222 of image data may display a live rendered image, illustrated here by way of example as a clown, such that the video stream provides a clown perceived by a guest to be moving in real time. As shown, the pixel pattern 224 may include black or colored light emitted by pixels on or around elements (e.g., clown) of the image. For example, a pixel of the display 102 may be expected to emit black light (e.g., absence of light), which may be described as a black pixel 226 herein. In the depicted embodiment, a black pixel 226 may be expected on the bottom corner of the display 102 in the first frame 220.

However, in the subsequent frame of image data, the second frame 222, the clown may have changed his action and the pixel pattern 224 may have also changed. As depicted in the second frame 222, the black pixel 226 may be expected to appear on the top right corner of the display 102. It should be understood that the illustrated pixels (e.g., black pixels 226 and/or white pixels 227) are shown as relatively large within the display 102 by way of example. However, each pixel may be sized to correspond to the pixel size of the display 102, which is a function of the display resolution. Further, the illustrated pixels of the pixel pattern 224 may also include groups of contiguous pixels forming larger shapes or patterns. Still further, while the illustrated pixel pattern 224 is formed from black pixels 226 and white pixels 227, other color combinations are also contemplated. Still further, the pixel pattern 224 may be selected to be generally not visible to the viewer. In one example, the pixel pattern may be distributed about sections of the frames 220, 222 that are associated with background images. In an embodiment, the pixel pattern 224 is formed only from noncontiguous pixels to render the pixel pattern 224 less discernible to the viewer. In an embodiment, individual pixels of the pixel pattern 224 are selected to be a different color from every surrounding pixel in the expected image of the frames 220, 222. In an embodiment, an individual pixel of the pixel pattern is separated from other pixels in the pixel pattern 224 by at least 2, 3, 5, or 10 other pixels.

The display 102 may exhibit an unexpected pixel pattern, indicating an unexpected display. To illustrate, FIG. 5 depicts an unexpected pixel pattern 225 on an erroneous first frame' 228 (Frame 1'). Although the erroneous first frame' 228 displays the correct expected frame image, such as the image of first frame 220, the expected black pixel 226 of the pixel pattern 224 fails to appear, indicated as incorrect pixel 229. In other embodiments, the unexpected pixel pattern 225 may include, but is not limited to, one or more pixels that appear as a different color and/or change locations on the display 102. In some implementations, such a change in pixel locations or color may be caused by an error in the video rendering that may not be visible on the overall displayed image itself. The error may be caused by digital media errors in the video stream 156 that may otherwise go undetected and result in false positives determined by other monitoring mechanisms, such as the limited detection of a video output to the display 102 via hardware/cables or physical observations by operators 110 or guests. Thus, the embedded pixel pattern 164 may allow detection of internal errors and early detection that may otherwise rely on external data and/or hardware.

Additionally or alternatively, an unexpected display may also include an error on the displayed image itself. For example, if the rendered image fails to change or is frozen from one image frame to the next, the expected light emission at a pixel location may not appear on the display 102. Moreover, additional images on the display 102, such as a dialog box or another user prompt, may cause the expected light emission at a pixel location to not appear on the display 102.

To illustrate, FIG. 6 illustrates an erroneous second frame' 230 (Frame 2'), which displays the expected image and expected pixel pattern 224 of the second frame 222, but with an error dialog box 231 waiting for user input. The dialog box 231 may appear as a result of a change or temporary loss of video output, etc. Due to the dialog box 231, the expected black pixel 226 of the expected pixel pattern 224 may not appear in the expected location, and thus, indicate that the image displayed on the display 102 may be an unexpected error. Therefore, determining the pixel pattern 224 displayed may detect an unexpected display error. In an embodiment, by distributing the pixel pattern 224 about a variety of locations of the display 102 via a dynamic pixel pattern and/or a static pixel pattern positioned to be within all quadrants of the display 102, detected errors may be characterized. For example, a display failure at a particular pixel location and that is confined to a single location while the rest of the display is undamaged may present differently than a video freeze error that effects the display more globally. That is, a single pixel failure may not be associated with an error in the video stream 156 but rather a hardware error at the display 102. Accordingly, such an error may not trigger the switch to the alternative video source 174. In another example, an error associated with a pop-up error window may be associated with a pixel mismatch in a predictable area of the display 102.

Returning to the process 200 of FIG. 3, the error detection logic 176 of the monitoring sub-system 154 may determine whether (decision block 210) the displayed pixel pattern 224 is within a predetermined threshold (e.g., pixel mismatches) of the expected dynamic embedded pixel pattern 164. The error detection logic 176 may calculate this determination using algorithms previously discussed (e.g., error threshold and pattern threshold algorithms). The algorithms may analyze the received data (e.g., the image data and pixel pattern displayed) from the display 102 and compare it to a predetermined threshold that may be set by a user or an operator 110. Thus, the error threshold for pixel location or color emitted may be set such that it does not interfere with the seamless viewing experience for a guest on the ride 100. The monitoring sub-system 154 may relay the display data 184 and/or an error signal 186 to the video stream controller 152. Additionally or alternatively, the video stream controller 152 may determine if the relayed display data 184 is within the predetermined threshold of the expected embedded pixel pattern 164 using algorithms stored in the memory 158 of the video stream controller 152.

Upon determination that the displayed pixel pattern is within the threshold of the expected embedded pixel pattern 164, the video stream controller 152 may continue sending (process block 212) the video stream 156 to the display 102. Thus, the video stream 156 may continue sending the primary video stream 168 with the embedded pixel pattern 164.

Figure 7:
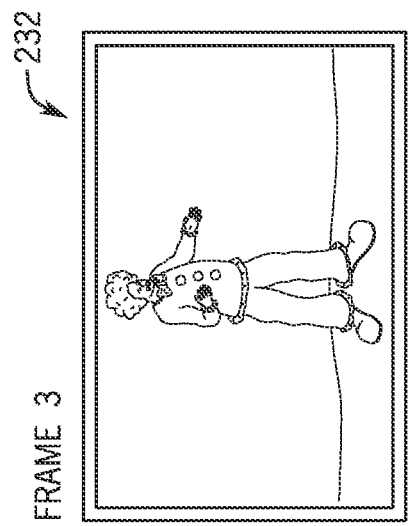
FIG. 7 is a schematic diagram of a frame of image data provided by the alternative video stream, in accordance with an embodiment of the present disclosure.

On the other hand, if the displayed pixel pattern is not within the threshold of the expected embedded pixel pattern 164, resulting in a video stream error (a "B-Roll" condition) determination, the video stream controller 152 may use switch 172 to switch (process block 214) from the video stream 156 to the alternative video source 174. To illustrate, FIG. 7 depicts a third frame 232 (Frame 3), which displays a frame of the alternative video source 174. As shown, the third frame 232 of the alternative video source 174 may include a non-interactive image, such as image data of a pre-recorded B-roll video. The pre-recorded video roll may not be interactive or live rendered, and thus, may not be embedded with a pixel pattern 164 to detect errors that may otherwise be difficult to detect with interactive or live rendered video streams. Additionally or alternatively, the alternative video source 174 may be a full backup of the original video stream 156 that was displaying prior to the detection of the unexpected display. For example, the full backup may include a redundant system for generating the video stream 156 that includes the primary video stream 168 along with the embedded pixel pattern 164. Additionally or alternatively, the alternative video source 174 may include a different interactive or live rendered video stream along with an embedded pixel pattern 164. The alternative video source 174 option may be determined based on the most suitable source for providing a seamless viewing experience for guests on the ride 100.

The alternative video source 174 may be switched within a quick response time frame such that there is minimal delay associated with the switching of streams. To provide a quick switching mechanism, the alternative video source 174 and the video stream 156 may both be streams that are be sent to the display 102 concurrently. However, the display 102 may be instructed to change its image output based on instructions received via the video stream controller 152 upon error detection or an unexpected display. In an embodiment, the alternative video source may be stored locally at the display 102. In this manner, the switching may not be observed or noticeable by guests, and thus, continue providing a seamless viewing experience.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method of managing a video feed, comprising:
embedding a dynamic pixel pattern into frames of a live video feed, wherein the dynamic pixel pattern comprises a first pixel pattern associated with a first frame of the live video feed and a second pixel pattern associated with a second frame of the live video feed, wherein the first pixel pattern is different than the second pixel pattern;
displaying the live video feed comprising the dynamic pixel pattern on a display;
monitoring displayed images on the display;
identifying an error in the live video feed in response to determining that the monitored displayed images comprise displayed pixel patterns that do not match the embedded dynamic pixel pattern; and
switching from displaying the live video feed to displaying an alternative video feed in response to identifying presence of the error in the live video feed.

2. The method of claim 1, wherein the alternative video feed comprises a full backup of the live video feed and the embedded dynamic pixel pattern, a new video feed different than the live video feed, or a combination thereof.

3. The method of claim 1, wherein the live video feed embedded with the dynamic pixel pattern and the alternative video feed are provided to the display concurrently.

4. The method of claim 1, wherein the first frame and the second frame are embedded in successive frames of the live video feed.

5. The method of claim 1, wherein monitoring comprises assessing an individual frame of the live video feed to identify a pixel pattern of the embedded dynamic pixel pattern associated with the individual frame.

6. The method of claim 1, wherein information about the embedded dynamic pixel pattern is encrypted and accessible via a key.

7. The method of claim 1, wherein identifying the error is based at least in part on a predetermined threshold of pixel mismatches between a displayed pixel pattern and the first pixel pattern during the first frame or the second pixel pattern during the second frame.

8. A video controller, configured to:
receive a primary video stream; and
receive a dynamic pixel pattern, wherein the dynamic pixel pattern comprises a changed pixel pattern for each frame of the primary video stream;
combine the primary video stream and the dynamic pixel pattern into a single video stream;
send the single video stream for display on a display; and
monitor the display for an error on the display, the error based at least in part on a mismatch associated with the dynamic pixel pattern; wherein the video controller is configured to: identify the error based on the mismatch; and automatically switch to sending a secondary video stream to the display.

9. The video controller of claim 8, wherein the primary video stream comprises a live video comprising interactive elements that change based on a presence of a guest.

10. The video controller of claim 8, wherein the secondary video stream comprises a prerecorded video stream.

11. The video controller of claim 8, wherein the secondary video stream comprises a live rendered video stream embedded with a dynamic pixel pattern as the single video stream.

12. The video controller of claim 8, wherein the dynamic pixel pattern is encrypted and accessible using a corresponding key.

13. The video controller of claim 12, wherein the corresponding key is based at least in part on metadata, a network connection, a memory location, or any combination thereof, associated with the video controller or the dynamic pixel pattern.

14. The video controller of claim 8, wherein the error comprises a dialog box on a video frame, a frozen video frame, or a combination thereof.

15. The video controller of claim 8, wherein a pattern of the dynamic pixel pattern is based at least in part on elements displayed during each frame.

16. The video controller of claim 15, wherein the pattern comprises contiguous pixels or noncontiguous pixels based at least in part on the elements.

17. A tangible, non-transitory, machine-readable medium, comprising machine-readable instructions, to:
embed a dynamic pixel pattern into frames of a live video feed, wherein the dynamic pixel pattern comprises a first pixel pattern associated with a first frame of the live video feed and a second pixel pattern associated with a second frame of the live video feed, wherein the first pixel pattern is different than the second pixel pattern;
display the live video feed comprising the dynamic pixel pattern using a display;
monitor displayed images on the display; and
identify an error in the live video feed in response to determining that the monitored displayed images comprise displayed pixel patterns that do not match the embedded dynamic pixel pattern; and switch from displaying the live video feed to displaying an alternative video feed in response to identifying the error in the live video feed.

18. The tangible, non-transitory, machine-readable medium of claim 17, wherein the dynamic pixel pattern is associated with a subset of a total number of pixels of the first frame and the second frame.

* * * * *